UNITED STATES PATENT OFFICE.

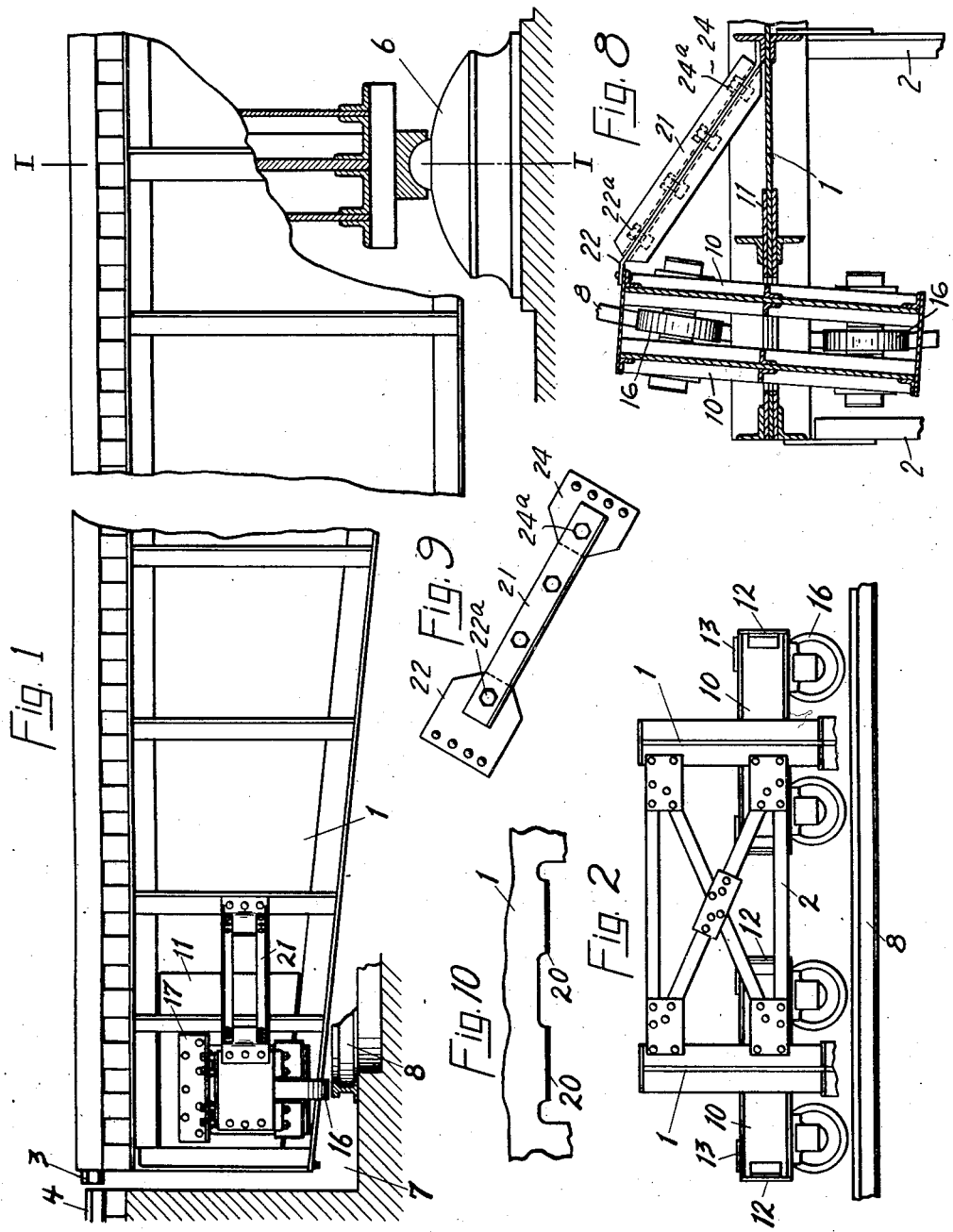

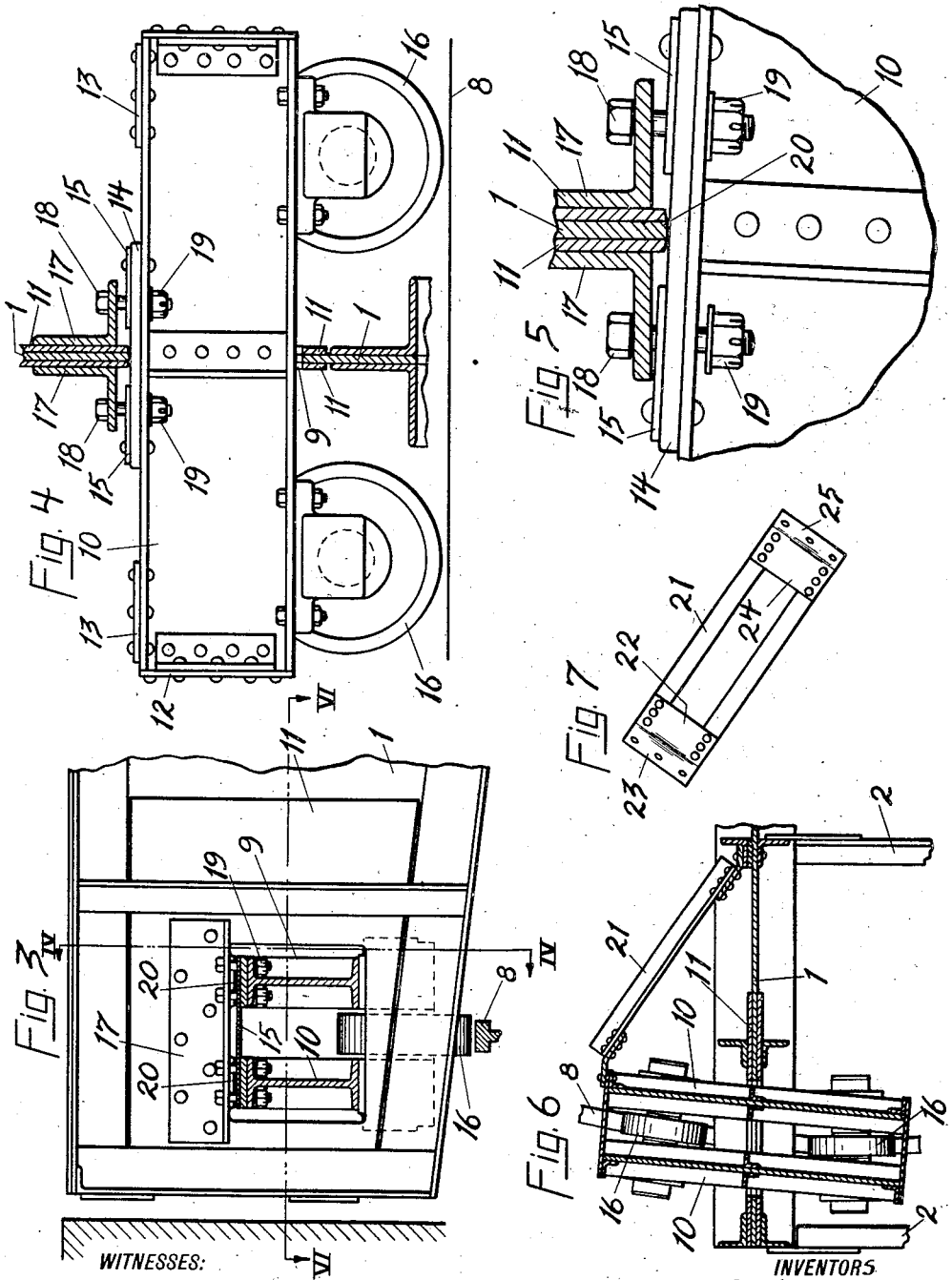

OTIS E. HOVEY, OF NEW YORK, N. Y., AND CARL W. CHASE, OF GARY, INDIANA.

TURN-TABLE.

1,246,432.  Specification of Letters Patent.  Patented Nov. 13, 1917.

Application filed April 11, 1917. Serial No. 161,184.

*To all whom it may concern:*

Be it known that we, OTIS E. HOVEY and CARL W. CHASE, both citizens of the United States, and residents, respectively, of New York, in the county of New York and State of New York, and Gary, in the county of Lake and State of Indiana, have invented certain new and useful Improvements in Turn-Tables, of which the following is a specification.

This invention relates to locomotive turn-tables of that class wherein the turntable is supported at its middle on a center bearing, and is provided at its opposite ends with wheeled trucks to travel upon a circular track, this track generally but not necessarily being at the bottom of a circular turn-table pit and disposed concentrically with the center bearing. The turntable, normally, is balanced on the center bearing and the truck wheels on one or the other, or possibly both ends of the turntable are above and out of contact with the track. At the instant the front wheels of a locomotive come upon one end of the turntable, in transferring the locomotive to the turntable, said end is immediately and violently depressed, and thereupon the wheels of the trucks will be brought into contact with the circular track rail. Because of inequalities in the track formed by this rail, one wheel of the truck may strike the rail before the other, and then the turntable structure will become distorted or twisted when the other wheel of the truck comes down into engagement with the rail. Heretofore, in seeking to avoid twisting and distortion of the turntable, the end trucks have been mounted on horizontal pivots so that when one wheel strikes the track, the truck will immediately swing on the pivot and bring both wheels into proper engagement with the track. Inasmuch as the pivotal mounting of the trucks forms the weakest part of the structure and soon becomes worn and thereby causes binding of the pivotal connections, it is an important object of the present invention to dispense with the pivotal connections and to provide rocking, non-pivotal connections between the wheeled trucks and the turntable, whereby the trucks may oscillate or rock in a vertical plane on surface bearings or seats on the girders of the turntable. The connections between the trucks and the turntable are loose, as distinguished from pivotal connections involving pintles or the like. These loose connections, of course, include limiting devices to prevent undue looseness, and furthermore each truck has one or both ends braced or tied to the turntable in such a manner as to give the desired strength to the structure without interfering with the oscillating or rocking movement of the end trucks necessary to accomplish the objects of the invention.

With these and other objects in view, the present invention consists in the combination and arrangement of parts, as will be hereinafter more fully described, shown in the drawings, and particularly set forth in the appended claims, it being understood that changes in the form, proportion, size and minor details may be made within the scope of the claims, without departing from the spirit or sacrificing any of the advantages of the invention.

In the drawings,

Figure 1 is a fragmentary side elevation of about one-half of a turntable embodying the features of the present invention, the turntable being symmetrical about the line I—I.

Fig. 2 is an end elevation thereof.

Fig. 3 is a side elevation on a larger scale showing one end of the turntable, the wheeled truck being in section.

Fig. 4 is a detail enlarged sectional view taken on the line IV—IV of Fig. 3, the truck being in normal position above the circular track.

Fig. 5 is a detail fragmentary sectional elevation showing the position assumed by the trucks when titled to accommodate themselves to some inequality in the track.

Fig. 6 is a horizontal section taken on the line VI—VI of Fig. 3, and on a somewhat smaller scale.

Fig. 7 is a detail side elevation of the diagonal brace or strut on the truck of Fig. 6.

Fig. 8 is a sectional plan similar to that of Fig. 6 showing a modified form of diagonal brace or struct for connecting the ends of the trucks to the girders of the turntable.

Fig. 9 is a side elevation of the modified form of diagonal brace or strut shown in Fig. 8.

Fig. 10 is a detail fragmentary view of a portion of one of the girders showing the bearing surfaces on which the wheeled trucks rock.

Like characters of reference designate corresponding parts in each of the several figures of the drawings.

The turntable generally is of any well known or preferred construction, and includes a pair of spaced substantially parallel girders 1—1 suitably connected by transverse bracing or lattice girders 2, a fragmentary portion of the latter being indicated in Fig. 6 of the drawings. A floor of any desired construction is laid on the girders, and on this floor are the locomotive track rails, one of which has been shown at 3 in Fig. 1 of the drawings, which track rails are intended to come into alinement with the locomotive track 4 and to support the locomotive when it is run upon the turntable. The body of the turntable is supported at its middle, in the usual manner, upon a center bearing 6 of any approved form. The turntable, as shown, is mounted within a suitable pit 7, and a circular rail 8 placed in the bottom of this pit beneath the ends of the turntable and disposed concentrically with respect to the center bearing forms a track for the wheeled trucks on the ends of the turntable girders. Each end of the turntable is supported upon wheeled trucks, one truck at each end of each girder, and the assemblage or connection between the truck and the girder constitutes the subject matter of the present invention.

As best shown in Figs. 3 and 6 of the drawings, an opening 9, rectangular in outline, is formed in each end of each girder, and the I-beams 10 of a truck extend through each of these openings and project equally on opposite sides of the girder. Suitable reinforcing plates 11 are applied to the sides of the girder 1, and these plates are, of course, provided with openings registering with the openings 9 in the web of the girders. The ends of the two I-beams of each truck are connected by end plates 12 and top plates 13. At the middle of the truck, upon the top flange of each I-beam, is a wear plate 14, and corresponding ends of the two wear plates are connected by cross bars or plates 15. A pair of wheels 16 are mounted upon each truck, with the axes of the wheels arranged to extend radially from the bearing 6 at the center of the circular track 8 and disposed between the I-beams 10 in position to run upon the circular track.

For connecting the trucks to the girders, an angle 17 is applied to each side of the girder immediately above the opening 9 therein, and through the lower horizontal outstanding flange of each angle are two pairs of bolts 18, one pair for each I-beam 10 of the truck frames. Each bolt extends through a cross bar 15, wear plate 14 and the top flange of one of the I-beams 10, there being one bolt at each side of the web of the beams. Castle nuts 19 are provided upon the lower ends of the respective bolts which are secured in place by cotters in the old and well known manner. The vertical dimension of the opening 9 in the girder is somewhat greater than the vertical depth of the truck so as to permit of the necessary tilting of the latter, and therefore the truck normally depends or hangs on the nuts 19 of the bolts, as best shown in Fig. 4 of the drawings, because the trucks do not normally engage the pit rail 8 when the turntable is empty, as hereinbefore explained.

With the construction and arrangement of the trucks as herein described, when a locomotive is run upon the turntable and the near end thereof is depressed under the weight of the locomotive, if one of the truck wheels 16 comes into engagement with the track 8 before the other wheel engages the track, it is quite apparent that the truck will tilt vertically until both wheels engage the track, such tilting bringing about a relation of parts as indicated in Fig. 5 of the drawings, wherein the wheel 16 at the left hand end of the truck was the first to come into engagement with the track.

Tilting or rocking of the trucks on the girders is facilitated by providing the girders with two bearings 20, one for each of the pairs of beams forming each truck. Each of these bearings is a boss or downward extension at the top edge of the opening 9 in the girder, the bottom edge of the bearing or boss being curved or rounded transversely so as to permit of an easy tilting or rocking movement of the truck thereon. Each of these bearings, of course, engages the wear plate 14 on the top of the adjacent truck beam. Should the truck be required to rock or tilt to an extent more than would be permitted by the play of the bolts 18 in the openings through the top of the truck, such additional movement will be permitted by the bending or flexing of the bottom flanges of the angles 17. It will, of course, be understood that the flanges will return to their normal positions when the locomotive is run off of the turntable, by reason of the elasticity of the metal.

By reason of the loose connection between the truck and the girder, as herein shown and described, it will be seen that there is provided a rocking, non-pivotal connection between the truck and the girder, such that the truck will tilt vertically on its bearing against the under edge of the girder, and therefore the truck will accommodate itself to the track and there will be no bending strains nor any distortion whatsoever of the girder and framework of the turntable.

As soon as the locomotive has been run to an intermediate balanced position upon the turntable, the truck will resume its normal position, and neither the truck nor the girder will have been put under any twisting strains.

If desired, the truck may be braced by a diagonal brace or strut, such as shown at 21 in Figs. 6 and 7 of the drawings. This diagonal brace, as shown in Figs. 6 and 7, preferably consists of a pair of angles connected by the end 23 of a bent plate 22 to one end of the truck, the other ends of the angles 21 being connected by the end 25 of a bent plate 24 to the adjacent face of the girder 1. The angles 21 are capable of bending under the tilting movements of the truck so as not to interfere with such tilting or rocking movements, while at the same time the diagonal brace or strut maintains the truck in its proper relation to the girder.

Instead of rigidly connecting the diagonal bracing or struts 19ª to the bent plates 22 and 24 in the manner shown in Fig. 6, the ends of the struts may be pivotally connected to the plates 22, 24 by means of bolts 22ª and 24ª as is shown in Figs. 8 and 9.

The advantages of my invention will be appreciated by those skilled in the art.

Modifications in the construction and arrangement of the parts may be made without departing from our invention as defined in the appended claims.

We claim:—

1. A locomotive turntable having a wheeled truck provided with a rocking non-pivotal bearing upon the turntable.

2. A locomotive turntable having a wheeled truck, and means for loosely suspending the truck from the turntable and permitting vertical tilting of the truck on the turntable.

3. A locomotive turntable including a girder provided with an opening therethrough, a wheeled truck extending through the opening and capable of tilting vertically therein and a rocking non-pivotal connection between the truck and the girder.

4. A locomotive turntable including a girder having an opening therethrough, a wheeled truck extending through the opening, a bearing on the top edge of the opening in the girder for engagement by the truck, and connecting means loosely suspending the truck from the girder and permitting vertical tilting or rocking of the truck on the bearing on the girder.

5. A locomotive turntable including a girder, a wheeled truck extending across the girder, flanges at opposite sides of the girder, and headed fastenings extending through the flanges and the frame portion of the truck, said fastenings being loose in the truck and in the flanges and permitting vertical tilting of the truck with respect to the girder.

6. A locomotive turntable including a girder having an opening therethrough provided with a bearing on the upper edge of the opening, a wheeled truck extending through the opening, flanges on opposite sides of the girder at the opening therethrough, and headed fastenings passing loosely through the flanges and the frame portion of the truck and permitting vertical tilting or rocking of the truck on the bearing on the girder.

7. A locomotive turntable including a girder having an opening therethrough, a wheeled truck extending through the opening and including a flanged frame beam, flanges on opposite sides of the girder and at the opening therethrough, and headed fastenings passing loosely through the flanges of the girder and the flanged portion of the truck frame and permitting vertical tilting of the truck upon the girder.

8. A locomotive turntable including a girder provided with an opening therethrough, the upper edge of the opening having a pair of spaced depending bearing bosses, angles applied to opposite sides of the girder with their bottom flanges extending outwardly across the top of the opening, a wheeled truck extending through the opening and including a pair of spaced I-beams, and headed fastenings passing loosely through the bottom flanges of the angles and the flanges of the I-beams and permitting vertical rocking or tilting of the truck on the bearing bosses of the girder.

In testimony whereof we have hereunto set our hands.

OTIS E. HOVEY.
CARL W. CHASE.